April 14, 1936.  T. V. BUCKWALTER  2,037,208
LOCOMOTIVE CROSSHEAD
Filed April 28, 1933   2 Sheets-Sheet 1
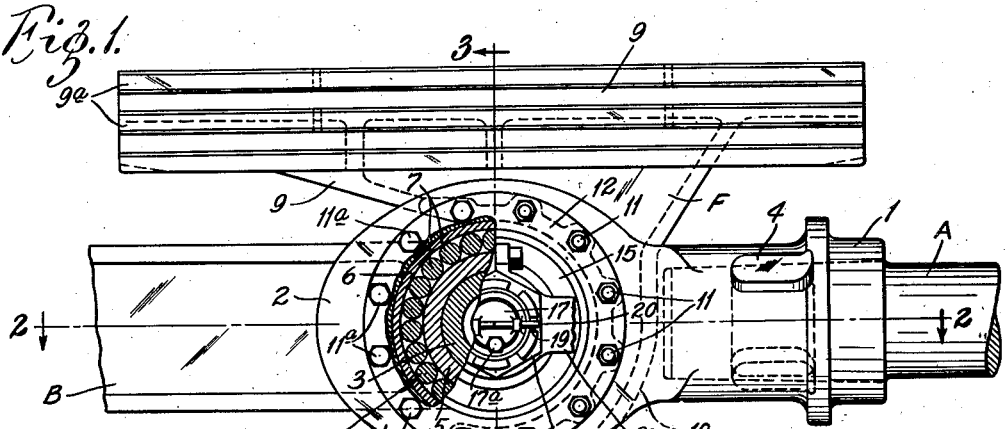
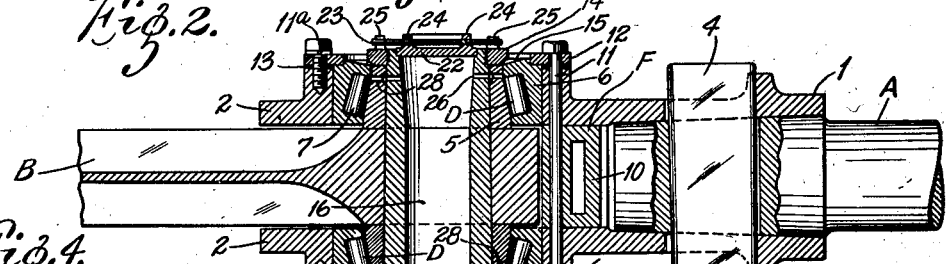
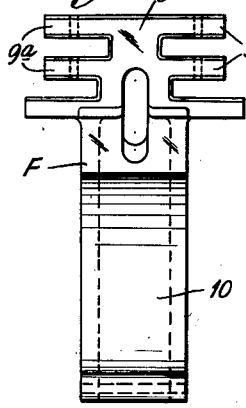
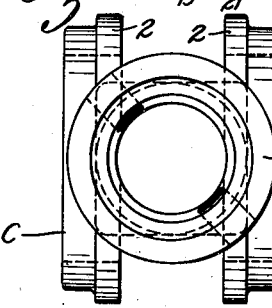
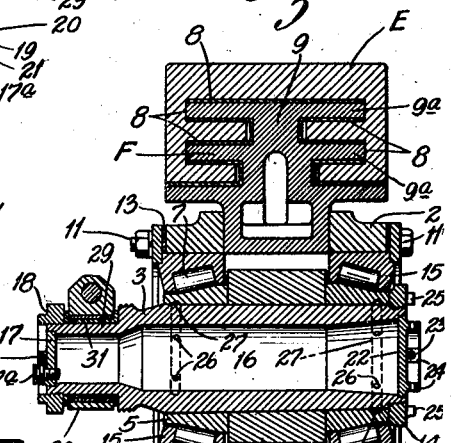
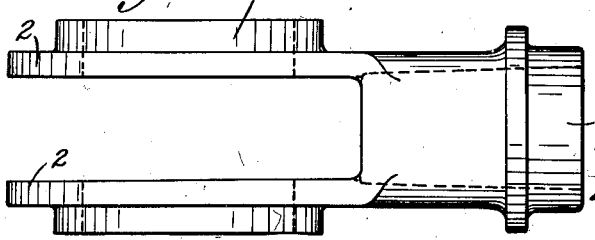

April 14, 1936.  T. V. BUCKWALTER  2,037,208
LOCOMOTIVE CROSSHEAD
Filed April 23, 1933  2 Sheets-Sheet 2
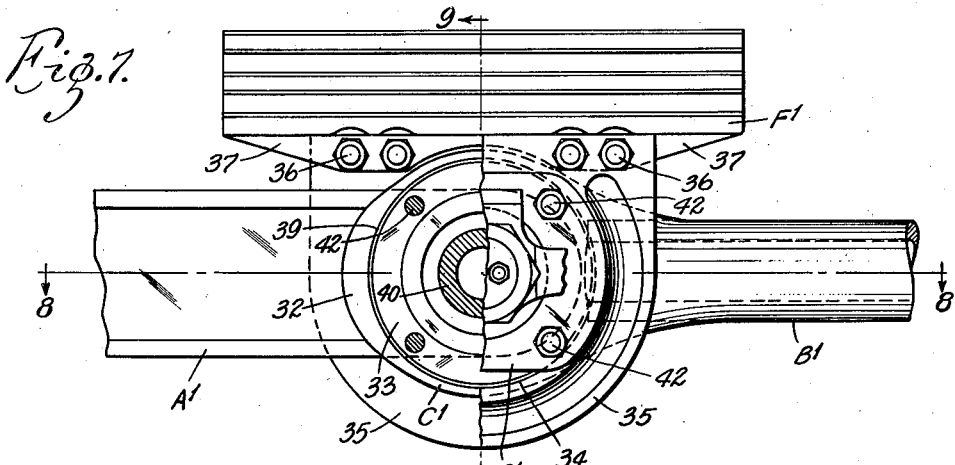
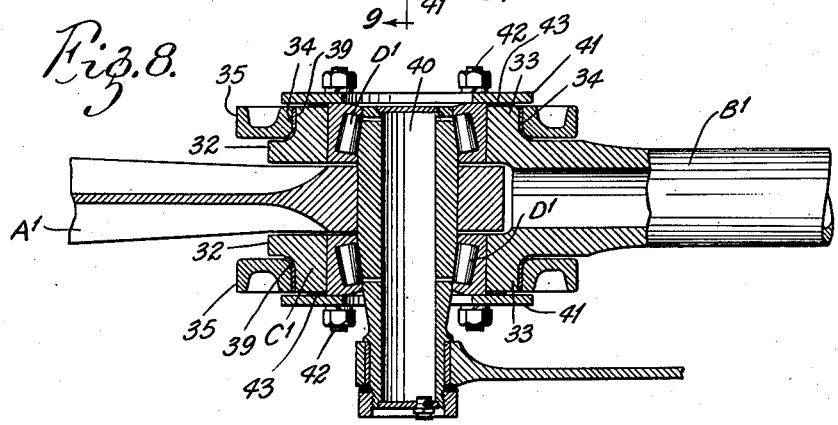
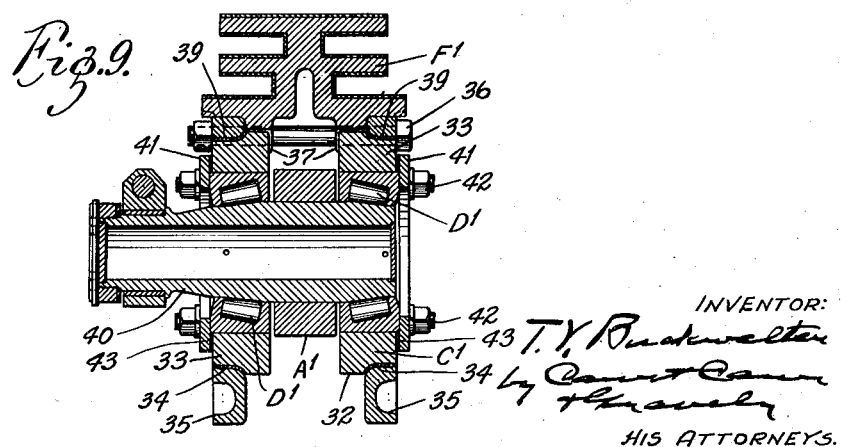
INVENTOR:
T. V. Buckwalter
by
HIS ATTORNEYS.

Patented Apr. 14, 1936

2,037,208

UNITED STATES PATENT OFFICE 2,037,208

LOCOMOTIVE CROSSHEAD

Tracy V. Buckwalter, Canton, Ohio, assignor to The Timken Roller Bearing Company, Canton, Ohio, a corporation of Ohio Application April 28, 1933, Serial No. 668,336

7 Claims. (Cl. 287—100)

This invention relates to crossheads, particularly crossheads of the type used on locomotives for connecting the forward end of the main rod to the piston rod. It has for its principal objects to provide for simplicity and cheapness of construction and compactness of design; to decrease the weight of the parts; to facilitate assembly and disassembly of the parts; to provide the crosshead with roller bearings; to provide proper lubrication for said bearings; to facilitate adjustment, inspection and removal and replacement of the roller bearings; and to obtain other advantages hereinafter appearing. The invention consists in the crosshead and in the parts and combinations and arrangements of parts hereinafter described and claimed.

In the accompanying drawings, which form part of this specification and wherein like symbols refer to like parts wherever they occur, Fig. 1 is a side elevation of a locomotive crosshead embodying my invention, Fig. 2 is a horizontal longitudinal section on the line 2—2 in Fig. 1, Fig. 3 is a vertical cross-section on the line 3—3 in Fig. 1, Fig. 4 is a rear end view of the shoe member, Fig. 5 is a plan view of the yoke member, Fig. 6 is a front end view of said yoke member, Fig. 7 is a side elevation of a modified form of crosshead, Fig. 8 is a horizontal longitudinal section on the line 8—8 in Fig. 7; and Fig. 9 is a vertical cross-section on the line 9—9 in Fig. 7.

The present crosshead is particularly adapted for transmitting the reciprocating motion of the piston rod A of a locomotive to the front end of the main or connecting rod B thereof. The crosshead illustrated on sheet 1 of the drawings comprises a yoke member C having a shank portion 1 adapted to be connected to the back end of the piston rod A and horizontally spaced parallel branches 2 between which the forward end of the main rod is pivotally secured by means of a horizontal wrist pin 3 that extends transversely of said branches. The piston rod is held in a tapered socket provided therefor in the shank portion 1 of the yoke member C by means of a tapered key 4 which extends through cooperating slots in said piston rod and said shank portion. The branches 2 of the yoke member and the portion of the main rod disposed therebetween are provided with alined openings adapted to receive the ends of the wrist pin 3. The middle portion of the wrist pin has a tight taper fit in the opening in the main rod; and the ends of said wrist pin are rotatably supported in the openings in the respective branches 2 of the yoke member. The wrist pin is supported at its ends in antifriction bearings, preferably tapered roller bearings D, mounted in the branches of the yoke member. Each of the tapered roller bearings D comprises a cone or inner bearing member 5, a conical cup or outer bearing member 6 and conical bearing rollers 7 interposed between said cone and cup. The conical inner bearing members 5 are mounted on the ends of the wrist pin; and the conical outer bearing members 6 seat within the openings in the branches of the yoke member.

The yoke member C is suspended from a guide member E for sliding movement parallel to the axis of the piston rod A by means of a shoe F. The guide member E, which is rigidly secured to the locomotive in any desired manner (not shown), is of substantially inverted channel-shaped cross-section with vertically spaced outstanding flanges along its side walls that form ways or slides 8 in which the shoe F moves. The shoe F comprises a portion 9, which is provided along its opposite sides with vertically spaced outstanding flanges 9a that slidably engage the ways 8 in the guide E, and a rearwardly opening hook-shaped portion 10 that fits between the branches 2 of the yoke member C and loosely embraces the forward end of the main rod B so as to permit the necessary angular movement thereof. The depending hook portion 10 of the shoe F is rigidly secured between the branches of the yoke member of the crosshead by a series of annularly spaced through bolts 11 that extend through registering horizontal openings provided therefor in said branches and said hook portion.

The cups or outer bearing members 6 of the tapered roller bearings D are held in the openings provided therefor in the branches 2 of the yoke member by means of annular plates 12 that are secured to the outer faces of said branches with their inner margins overlapping the outer ends of said outer bearing members 6. Adjustment of the outer bearing members 6 to take up wear in the bearings is accomplished preferably by means of thin shims 13 interposed between the annular plates 12 and the branches 2 of the yoke member. As shown in the drawings, the annular retaining members 12 are held in place at points opposite the yoke engaging portion of the shoe F by means of the securing bolts 11 and at points intermediate said bolts by means of cap screws 11a. The wrist pin 3 is held against endwise movement in one direction by reason of its tapered fit in the main rod and in the opposite direction by means of a ring nut 14, which is threaded on the inner end of said wrist pin and abuts against the small end of the cone or inner bearing member 6 of the adjacent roller bearing.

As shown in the drawings, the outer bearing member 6 of each roller bearing is provided at the ends of its conical raceway with annular flanges or thrust ribs 15 that loosely confine the bearing rollers 7 therebetween. The usual cage is dispensed with and a full circular series of bearing rollers 7 is used, a proper running fit being provided for said rollers. Only a slight clearance is provided between the thrust ribs or flanges 15 of the outer bearing member 6 and the inner bearing member 5, so that in the event that the bearing rollers are flattened under very heavy loads or shocks, said flanges will come into contact with the cylindrical end portions of said inner bearing member, thus producing a plain bearing that cooperates with the roller bearing.

The wrist pin 3 is made hollow so as to provide a chamber or reservoir 16 for lubricant. The outer end of the hollow wrist pin is closed by means of a closure member in the form of a plug 17, which has an oil feed fitting 17a therein and is held tightly in said end of said pin by means of a ring nut 18 threaded thereon. Said ring nut is provided with diametrically opposed notches 19 adapted to receive the ends of a locking pin 20 which extends through perforated lugs 21 provided therefor on the plug 17. The other or inner end of the hollow wrist pin 3 is closed by means of a plug 22 that is held in position by means of a pin 23 that is supported in perforated lugs 24 on said plug with its ends fitting in diametrically opposed notches 25 provided therefor in the ring nut 14 that is threaded on the inner end of said wrist pin in abutting relation to the cone 5 of the supporting bearing therefor. The wrist pin 3 is provided adjacent to the small end of the cone 5 of each tapered roller bearing D with a plurality of radial extending holes 26, whose outer ends communicate with an annular groove 27 around the inner periphery of said cone. Said cone is provided with radial lubricant passageways 28 leading from the annular groove 27 in said cone to the outer end of the raceway thereon. With this arrangement, the movement of the wrist pin 3 causes the lubricant therein to pass out through its radial passageways 26 into the annular groove 27 and thence through the radial passageways 28 into the space occupied by the bearing rollers 7.

Mounted on the outer end of the wrist pin 3, between the ring nut 18 and a shoulder 29 on said wrist pin is an arm 30 that serves to transmit the motion of the sliding crosshead to the valve gear (not shown) for controlling admission to and exhaust of steam from the locomotive cylinder. A plain bearing sleeve 31 is interposed between the wrist pin and the valve gear operating arm 30 to cut down friction therebetween.

Figs. 7, 8 and 9 illustrate a pivoted crosshead construction. In this construction, the yoke C¹ is formed integral with the back end of the piston rod B¹ and has its branches 32 formed with outstanding pivot bosses 33 that surround the bearing receiving openings in said branches and are rotatably supported in openings 34 provided therefor in spaced parallel plates 35 that depend from the underside of a slidably supported shoe F¹. The depending yoke supporting plates 35 of the shoe F are bolted or otherwise removably secured by bolts 36 to the outer faces of spaced parallel flanges 37 that depend from the underside of said shoe. Bronze liners 39 are interposed between the bosses 33 of the branches 32 of the yoke C¹ and the openings in the plates 35 that depend from the shoe or slipper F¹. The wrist pin 40, which pivotally connects the main rod A¹ to the yoke C¹, is supported in the openings in the branches 33 of said yoke by means of taper roller bearings D¹ whose inner raceways are formed on the wrist pin itself. The bearings D¹ are held in place in the branches of the yoke by means of annular plates 41 that are secured by bolts 42 to the outer faces of the pivot bosses 33 in overlapping relation to the outer raceway members of said bearings. The bearings are adjusted by means of shims 43 interposed between the annular plates 41 and the pivot bosses.

The hereinbefore described crosshead has numerous advantages. The separation of the crosshead into two parts, the shoe F and the yoke C, permits the selection of proper material for these parts. For instance, the yoke may be made of forged steel or other alloy, while the shoe may be made in the form of a casting of relatively cheap metal. This making of the crosshead in two parts also reduces the weight thereof and facilitates assembly of the roller bearings. These roller bearings serve, not only to reduce friction between the parts and thus prolong the life thereof, but they also enable a further reduction in weight to be obtained by dispensing with the use of heavy brasses, wedges, adjusting devices and locking means. The roller bearings also reduce the temperature of the parts when running and permit the use of light weight material, such as aluminum alloys, in the main rods. The reduced weight of the reciprocating parts also permits the use of a smaller wrist pin. The wrist pin is made hollow and thus constitutes a reservoir for lubricant which is metered to the bearings where it is trapped by the thrust flanges 15 of bearing cups 6 and the close fitting bearing rollers 7. The bearing rollers are adjustably held in place by the rings 12 that are secured to the branches of the crosshead by the cap screws 11a and the through bolts 11, which bolts serve to hold the yoke and shoe firmly together and also to prevent the branches of the yoke from spreading.

The pivoted crosshead construction has all of the advantages of the rigid type of crosshead and the additional important advantage that it permits relative pivotal movement as between the yoke and the slidable shoe and thus prevents bending or bowing of the piston rod or tilting and jambing of the shoe in its guide due to the inertia of the reciprocating parts.

Obviously, the hereinbefore described crosshead construction admits of considerable modification without departing from the invention. Therefore, I do not wish to be limited to the precise construction shown.

What I claim is:

1. A crosshead comprising a yoke having alined openings in its branches, a wrist pin extending crosswise of said branches with its ends extending into openings therein, a shoe extending between said branches and spaced from said wrist pin, roller bearings for supporting the ends of said wrist pin in said openings, rings for retaining said bearings in said openings, and means for securing said rings to said branches, said means including bolts which serve also to secure said shoe between said branches.

2. A crosshead comprising a yoke having alined openings in its branches, a wrist pin extending crosswise of said branches with its ends extending into openings therein, a shoe having a portion that extends between said branches clear of said wrist pin, roller bearings for supporting the ends of said wrist pin in said openings, rings on the outer faces of said branches and overlapping the bearings therein, and bolts for securing said rings to said branches and for securing said shoe therebetween.

3. A crosshead comprising a yoke member having spaced branches, a wrist pin extending crosswise of said branches with its ends journaled therein, a shoe having a portion extending between said branches that extends partway around said wrist pin and is spaced therefrom, and bolts for removably securing to said branches the portion of the shoe extending therebetween.

4. A crosshead comprising a yoke member having spaced branches, a wrist pin extending crosswise of said branches, a shoe having a portion extending between said branches that extends partway around said wrist pin and is spaced therefrom, roller bearings mounted in said branches for rotatably supporting the ends of said wrist pin therein, bolts for removably securing to said branches the portion of the shoe extending therebetween, and rings overlapping the outer ends of said bearings and partially held in place by said bolts.

5. A crosshead comprising a yoke member having spaced branches, a wrist pin extending crosswise of said branches with its ends journaled therein, and a shoe having a portion disposed between and removably secured to said branches, said portion extending downwardly between said branches and beneath said wrist pin.

6. A locomotive crosshead construction comprising a reciprocating yoke member having spaced branches, a wrist pin disposed transversely of said branches, taper roller bearings mounted in said branches for rotatably supporting said wrist pin therein, each of said bearings comprising an outer bearing member and rollers between said outer bearing member and said wrist pin, and means for removably securing said bearings in said branches, said means comprising annular members bolted to said branches and overlapping the outer ends of the outer bearing members.

7. A crosshead construction comprising a yoke member having spaced branches, a wrist pin disposed transversely of said branches, taper roller bearings mounted in said branches for rotatably supporting said wrist pin therein, each of said bearings comprising an outer bearing member and rollers between said outer bearing member and said wrist pin, means for removably securing said bearings in said branches, said means comprising annular members bolted to comprising annular members bolted to branches and overlapping the outer ends of the outer bearing members, and adjusting shims interposed between said annular members and said branches.

TRACY V. BUCKWALTER.